Patented June 18, 1935

2,005,060

UNITED STATES PATENT OFFICE 2,005,060

SHELLAC SOLUTION FOR THE PRODUCTION OF ETCHED PHOTOGRAPHIC PRINTING FORMS AND METHOD OF PREPARING IT

Max Thimann, Cologne-Braunsfeld, Germany, assignor to firm Dr. Bekk & Kaulen Chemische Fabrik G. m. b. H., Loevenich, near Cologne, Germany No Drawing. Application February 24, 1933, Serial No. 658,431. In Germany March 19, 1931

3 Claims. (Cl. 95—7)

It is known to utilize for the production of etched photographic printing forms sensitized layers consisting of a shellac solution sensitized by means of chromate solutions. The copies obtained with the aid of a material of such nature may be immediately subjected to the etching process necessary for rendering the forms ready for printing, without requiring a strong heating of the metal plate, the so-called burning in, as it is required for the purpose of attaining resistance against acids when chrome gelatine layers are used, such heating greatly impairing the strength of the zinc plates generally employed for economic reasons.

It has been proposed to employ for this purpose an ammoniacal shellac solution. But it was found, that the employment of such solution imparted a moment of considerable uncertainty for the further treatment of the plate in the preparation of the printing form, said uncertainty being particularly observed in variations of the periods required for developing the picture on the plate to be prepared. The reason of these uncertainties has been found to be the volatility of the ammonia used for dissolving the shellac. Shellac solutions, which are richer in ammonia, dissolve more easily in the solvents (spirit or a mono- or polyhydric alcohol of a correspondingly higher molecular weight or other solvents for shellac), whilst solutions poorer in ammonia are less easily soluble therein and consequently require correspondingly longer periods of development. In view of the fact that the solutions in use cannot always be kept closed tightly against the open air, their solubility will gradually decrease more and more in consequence of the reduced basicity occasioned by the volatility of the ammonia. The same phenomenon also will be met with if, instead of the ammonia, other volatile alkaline reacting substances are employed for dissolving the shellac, as for instance methylamine.

The present invention obviates these drawbacks. For this purpose such alkaline reacting substances are employed for dissolving the shellac, which are not volatile at room or normal temperature. Here the fixed alkalis, e. g. sodium hydroxide and potassium hydroxide, will have to be considered in the first instance. But also their alkaline reacting salts, such as sodium carbonate particularly, may be made use of.

As the alkaline strength of such solutions remains constant, the properties of these solutions are not subject to changes, so that the required uniformity and reliability for the treatment and preparation of the printing forms are ensured.

It has further been found that an absolute stability of the solutions during their conversion into so called cold enamel layers can only be attained if for the sensitization of the solutions with chromates or bichromates, too, only salts of a non-volatile alkali are employed. If, for instance, a chromate (or bichromate) of a volatile alkali, e. g. of ammonia, is used for sensitizing purposes, a loss of alkali will gradually take place in consequence of the volatilization of ammonia and this gradual loss of ammonia will cause the requirement of constantly increasing periods of development of the image, even if a fixed alkali or its alkaline reacting salts have been used for the preparation of the shellac solutions. The employment of higher temperatures naturally accelerates the loss of ammonia from the solutions.

It is from this reason, that the sensibilization of the shellac solutions in accordance to the present invention is effected with the aid of chromates or bichromates of a non-volatile alkali only, as for instance sodium hydroxide or potassium hydroxide. This will ensure also for the sensitized solutions an absolute durability and uniformity in the development of the images for the printing form and an absolute independence of any kind of variations in temperature.

*Example*

100 grams of sodium carbonate are dissolved in 2 liters of water. This solution is employed for dissolving 500 grams of shellac. For sensitizing the shellac solution thus obtained a solution of 15 grams of potassium bichromate in 100 grams of water is used. The sensitized solution thus obtained will keep unchanged during a long period and, consequently, the layers produced by means of this solution on the metal plates or the like after exposure will be developed uniformly and during constant periods.

If it is desired to sensitize the shellac solution with chromate instead of bichromate, about 5 grams of sodium hydroxide may for instance be added to 100 grams of the above indicated solution of potassium bichromate.

Having now particularly described and ascertained the nature of my said invention, I declare that what I claim is:—

1. A method for preparing a shellac solution to be employed for the production of etched photographic printing forms, consisting in that shellac is dissolved by means of a non-volatile water soluble alkaline substance of the class consisting of the hydroxides and carbonates of the alkali metals, and that the shellac solution thus obtained then is sensitized by a water soluble chromate of a non-volatile alkali.

2. A method for preparing shellac solutions to be employed for the production of etched photographic printing forms, consisting in that shellac is dissolved by means of a non-volatile water soluble alkaline substance of the class consisting of the hydroxides and carbonates of the alkali metals, and that the shellac solution thus obtained then is sensitized by a water-soluble bichromate of a non-volatile alkali.

3. A shellac solution to be employed for the production of etched photographic printing forms, said solution consisting of shellac dissolved in an aqueous solution of a non-volatile alkaline substance of the class consisting of the hydroxides and carbonates of the alkali metals, said shellac solution being sensitized by a water-soluble chromate of a non-volatile alkali.

MAX THIMANN.